United States Patent
Sanuki et al.

(10) Patent No.: US 9,160,242 B2
(45) Date of Patent: Oct. 13, 2015

(54) ELECTRIC POWER CONVERSION DEVICE

(71) Applicant: PANASONIC INTELLECTUAL PROPERTY MANAGEMENT CO., LTD., Osaka (JP)

(72) Inventors: Maiya Sanuki, Shizuoka (JP); Takuya Masuda, Shizuoka (JP); Keisuke Muto, Shizuoka (JP); Susumu Kobayashi, Hyogo (JP); Masakazu Adachi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/407,910

(22) PCT Filed: May 21, 2013

(86) PCT No.: PCT/JP2013/003211
§ 371 (c)(1),
(2) Date: Dec. 12, 2014

(87) PCT Pub. No.: WO2013/186991
PCT Pub. Date: Dec. 19, 2013

(65) Prior Publication Data
US 2015/0124490 A1    May 7, 2015

(30) Foreign Application Priority Data

Jun. 15, 2012 (JP) ................. 2012-136174

(51) Int. Cl.
*H02M 3/335* (2006.01)
*H02M 1/00* (2007.01)
*H02M 7/48* (2007.01)

(52) U.S. Cl.
CPC ...... *H02M 3/33546* (2013.01); *H02M 3/33576* (2013.01); *H02M 2001/0058* (2013.01); *H02M 2007/4818* (2013.01); *Y02B 70/1441* (2013.01); *Y02B 70/1491* (2013.01)

(58) Field of Classification Search
CPC .......... H02M 3/33569; H02M 3/3376; H02M 7/53871; H02M 7/5387; H02M 7/537
USPC .......................... 363/16, 17, 95, 98, 131, 132
See application file for complete search history.

(56) References Cited

U.S. PATENT DOCUMENTS

| 4,951,185 A | 8/1990 | Schutten et al. |
| 5,438,497 A * | 8/1995 | Jain ................................. 363/17 |

(Continued)

FOREIGN PATENT DOCUMENTS

| JP | 03-128672 A | 5/1991 |
| JP | 03-251079 A | 11/1991 |

(Continued)

OTHER PUBLICATIONS

International Search Report issued in International Application No. PCT/JP2013/003211 with Date of mailing Jul. 30, 2013, with English Translation.

*Primary Examiner* — Adolf Berhane
(74) *Attorney, Agent, or Firm* — McDermott Will & Emery LLP

(57) ABSTRACT

A switching circuit is configured to switch on/off a current that flows through a resonance circuit constituted by a primary winding of a transformer, a capacitance element, and an inductor that are connected in series. Electric power that is induced in a secondary winding of the transformer is rectified by a rectifier circuit. A switch is connected in parallel with the capacitance element. A control unit is configured to control the switching circuit and the switch. The control unit is configured to select a first operation in which an operation frequency of the switching circuit is controlled by switching off the switch, and select a second operation in which a period during which a current flows from the switching circuit to the primary winding of the transformer is controlled by switching on the switch.

20 Claims, 7 Drawing Sheets

(56) References Cited

U.S. PATENT DOCUMENTS

| | | | |
|---|---|---|---|
| 6,195,270 B1 * | 2/2001 | Wittenbreder | 363/17 |
| 7,817,452 B2 * | 10/2010 | Smith | 363/132 |
| 2002/0054499 A1 * | 5/2002 | Tanaka et al. | 363/132 |
| 2004/0090807 A1 * | 5/2004 | Youm | 363/132 |
| 2009/0046482 A1 | 2/2009 | Smith | |
| 2012/0044718 A1 * | 2/2012 | Young et al. | 363/17 |
| 2013/0044519 A1 | 2/2013 | Teraura et al. | |
| 2014/0119060 A1 * | 5/2014 | Zhu et al. | 363/17 |

FOREIGN PATENT DOCUMENTS

| | | |
|---|---|---|
| JP | 4-125062 A | 4/1992 |
| JP | 2004-260928 A | 9/2004 |
| JP | 2006-158137 A | 6/2006 |
| JP | 2010-207014 A | 9/2010 |
| JP | 2011-234541 A | 11/2011 |

* cited by examiner

ELECTRIC POWER CONVERSION DEVICE

RELATED APPLICATIONS

This application is the U.S. National Phase application under 35 U.S.C. §371 of International Application No. PCT/JP2013/003211, filed on May 21, 2013, which in turn claims the benefit of Japanese Application No. 2012-136174, filed on Jun. 15, 2012, the disclosures of which Applications are incorporated by reference herein.

TECHNICAL FIELD

The present invention relates to an electric power conversion device that performs electric power conversion using a switching element and transmits electric power between an input and an output via a transformer.

BACKGROUND ART

Conventionally, electric power conversion devices are known that perform electric power conversion using a switching element and transmit electric power between an input and an output via a transformer. For example, a bidirectional DC/DC converter that transmits DC power bi-directionally is disclosed in JP 2011-234541 A (hereinafter referred to as "Document 1") as this type of electric power conversion device. The electric power conversion device described in Document 1 is provided with a primary circuit and a secondary circuit that sandwich a transformer.

The primary circuit and the secondary circuit each include a bridge circuit configured by a reverse conducting type semiconductor switch (switching element). The electric power conversion device can transmit desired DC power bi-directionally by controlling duty cycles (on duties) of the switching element of the primary circuit and the switching element of the secondary circuit.

Incidentally, although the electric power conversion device described in Document 1 can transmit desired DC power between the primary circuit and the secondary circuit by controlling the duty cycles of the switching elements, a voltage ratio between an input voltage and an output voltage depends on the winding ratio of the transformer. That is, the electric power conversion device described in Document 1 cannot output voltage by boosting the input voltage and only performs current adjustment, since bridge circuits are used in the primary circuit and the secondary circuit, and only the duty cycles are controlled.

On the other hand, an electric power conversion device that is used for utilizing electric power of a storage battery that is mounted in an automobile having an electric motor serving as a power source, a storage battery used by being attached to a building, or the like is required to have a function of adjusting a relationship between an input voltage and an output voltage over a wide range.

DISCLOSURE OF INVENTION

An object of the present invention is to provide an electric power conversion device configured to perform electric power conversion by switching and transmit electric power between an input and an output via a transformer, and is capable of adjusting a relationship between an input voltage and an output voltage over a wide range according to the use.

An electric power conversion device according to one aspect of the present invention includes a transformer, a resonance capacitance element, a switching circuit, a rectifier circuit, a switch, and a control unit. The transformer is configured to transmit electric power between an input and an output. The capacitance element is connected in series with a primary winding of the transformer. The switching circuit is configured to switch on/off current that flows through a series circuit constituted by the primary winding of the transformer and the capacitance element. The rectifier circuit is configured to rectify and output electric power induced in a secondary winding of the transformer. The switch is connected in parallel with the capacitance element. The control unit is configured to control a period during which current flows through the series circuit constituted by the primary winding of the transformer and the capacitance element and on/off of the switch. The control unit is configured to switch off the switch so as to configure, as an input-side circuit of the rectifier circuit, a first conversion circuit configured to change a relationship between an input voltage and an output voltage based on an operation frequency of the switching circuit. The control unit is configured to switch on the switch so as to configure, as the input-side circuit of the rectifier circuit, a second conversion circuit configured to change a relationship between an input voltage and an output voltage based on a period during which current flows from the switching circuit to the primary winding of the transformer. The control unit is configured to select an operation of the switching circuit from a first operation for adjusting the relationship in the first conversion circuit by controlling the operation frequency and a second operation for adjusting the relationship in the second conversion circuit by controlling the period during which the current flows.

In the electric power conversion device, the control unit is preferably configured to match a timing at which the switch is switched on with a zero-crossing point of the current that flows from the switching circuit to the series circuit constituted by the primary winding of the transformer and the capacitance element, when transitioning from the first operation of the first conversion circuit to the second operation of the second conversion circuit.

Preferably, the electric power conversion device further includes a series circuit constituted by a second switch and a resistor. The series circuit is preferably connected in parallel with the capacitance element. The control unit is preferably configured to switch on the switch after switching on the second switch when transitioning from the first operation of the first conversion circuit to the second operation of the second conversion circuit.

In the electric power conversion device, the control unit is preferably configured to provide a transition period during which an operation of the switching circuit is an operation different from the first operation of the first conversion circuit and the second operation of the second conversion circuit, when switching between the first operation of the first conversion circuit and the second operation of the second conversion circuit.

In the electric power conversion device, the control unit is preferably configured to store the operation frequency of the switching circuit in the first operation of the first conversion circuit in association with the relationship in the first conversion circuit, and store the period during which current flows from the switching circuit to the primary winding of the transformer in the second operation of the second conversion circuit in association with the relationship in the second conversion circuit. The control unit is preferably configured to control the switching circuit in accordance with the stored operation frequency and the stored period during which current flows, such that the relationship between the input voltage and the output voltage after switching coincides with the relationship between the input voltage and the output voltage before switching, when switching between the first operation of the first conversion circuit and the second operation of the second conversion circuit.

In the electric power conversion device, the control unit is preferably configured to store a conversion efficiency in the first operation of the first conversion circuit in association with the relationship in the first conversion circuit, and store a conversion efficiency in the second operation of the second conversion circuit in association with the relationship in the second conversion circuit. The control unit is preferably configured to select whichever of the first operation and the second operation has a higher stored conversion efficiency, when both the first operation of the first conversion circuit and the second operation of the second conversion circuit are operable, in an overlapping region between the relationship in the first conversion circuit and the relationship in the second conversion circuit.

Preferably, the electric power conversion device further includes a resonance inductor. The inductor is preferably connected between the primary winding of the transformer and the switching circuit.

Preferably, the electric power conversion device further includes a plurality of resonance inductors and a short-circuit switch. The plurality of inductors are preferably connected between the primary winding of the transformer and the switching circuit. The short-circuit switch is preferably configured to short-circuit at least one of the plurality of inductors.

In the electric power conversion device, the capacitance element preferably includes a plurality of resonance capacitors. The plurality of capacitors are preferably connected between the primary winding of the transformer and the switching circuit. The switch is preferably configured to short-circuit at least one of the plurality of capacitors.

In the electric power conversion device, the capacitance element preferably includes a resonance capacitor. The capacitor is preferably connected between the primary winding of the transformer and the switching circuit. The switch is preferably configured to short-circuit the capacitor.

In the electric power conversion device, both the relationship in the first conversion circuit and the relationship in the second conversion circuit are preferably a voltage ratio between the input voltage and the output voltage.

In the electric power conversion device, the first conversion circuit is preferably a resonance type conversion circuit. The resonance type conversion circuit is preferably configured to change the relationship in the first conversion circuit using a resonance circuit constituted by the capacitance element and the transformer by adjusting the operation frequency of the switching circuit. The second conversion circuit is preferably a phase shift type conversion circuit. The phase shift type conversion circuit is preferably configured to change the relationship in the second conversion circuit by adjusting the period during which current flows from the switching circuit to the primary winding of the transformer through changing a phase of switching on a switching element of the switching circuit.

According to the one aspect of the present invention, the electric power conversion is performed by switching, and the electric power is transmitted between the input and the output via the transformer. It is possible to adjust the relationship between the input voltage and the output voltage over a wide range according to the use by selecting one of the operation of the first conversion circuit and the operation of the second conversion circuit.

BRIEF DESCRIPTION OF DRAWINGS

Preferable embodiments according to the present invention will be described in more detail. Other features and advantages of the present invention will be better understood with reference to the following detailed description and the attached drawings.

Figure 4:
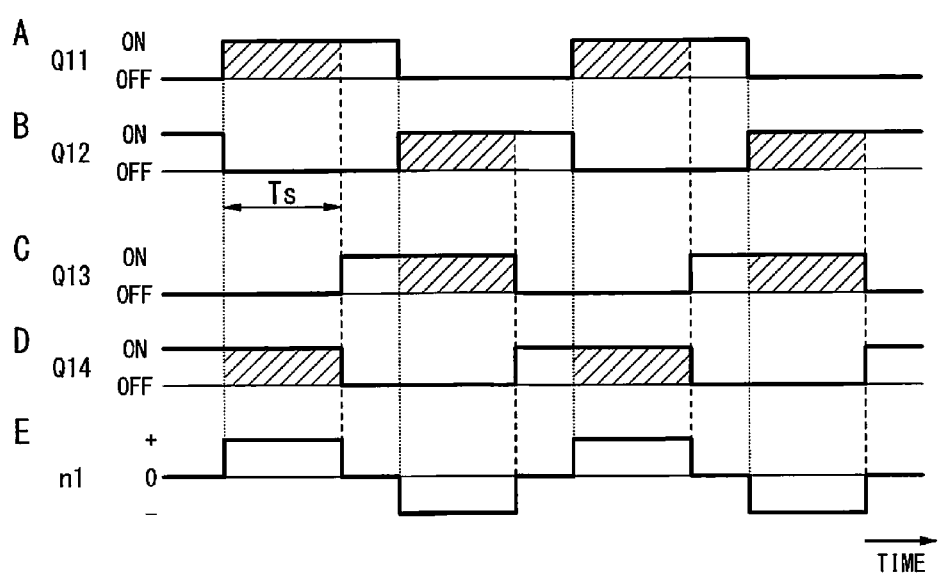
Figure 5:
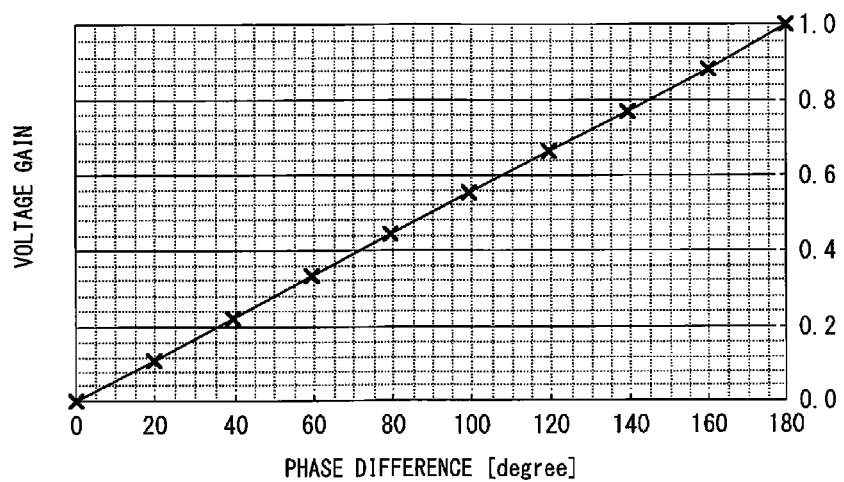
Figure 6:
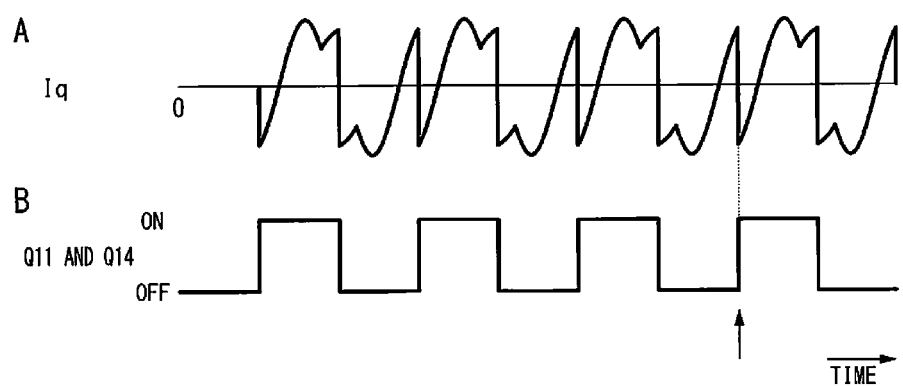
Figure 7:
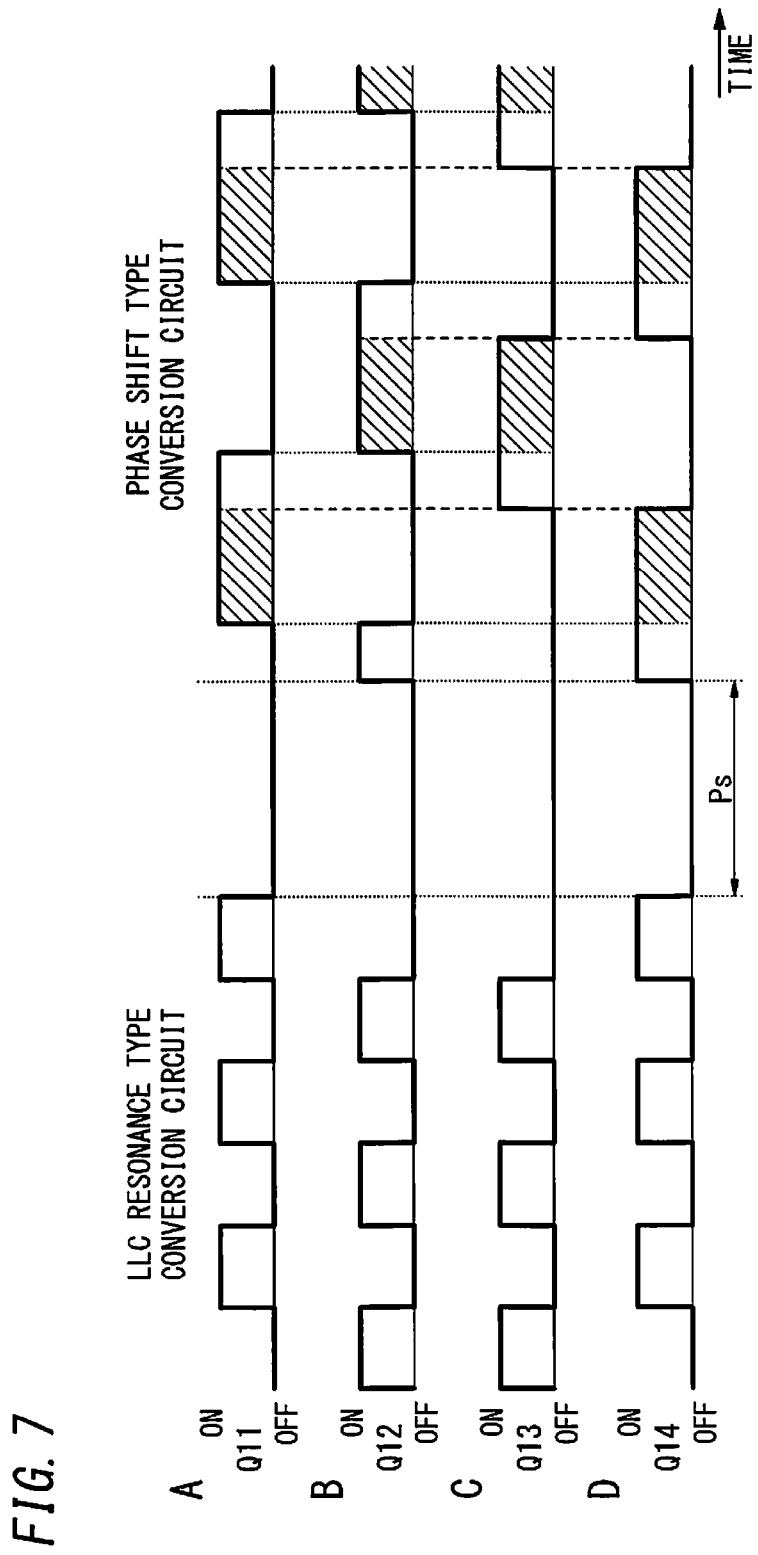
Figure 8:
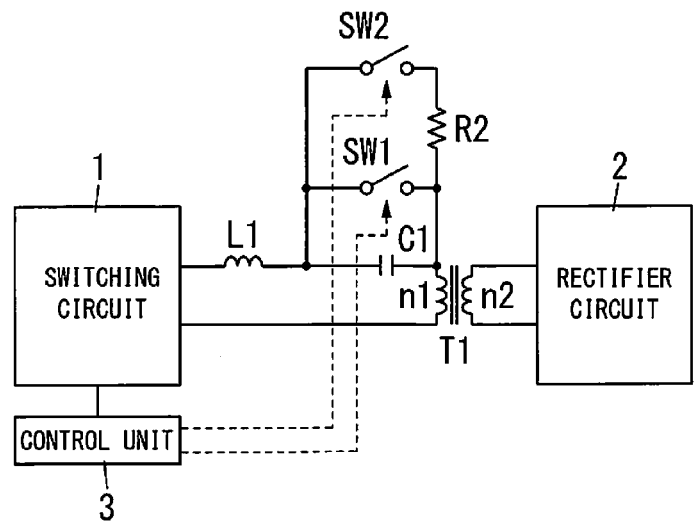
Figure 9:
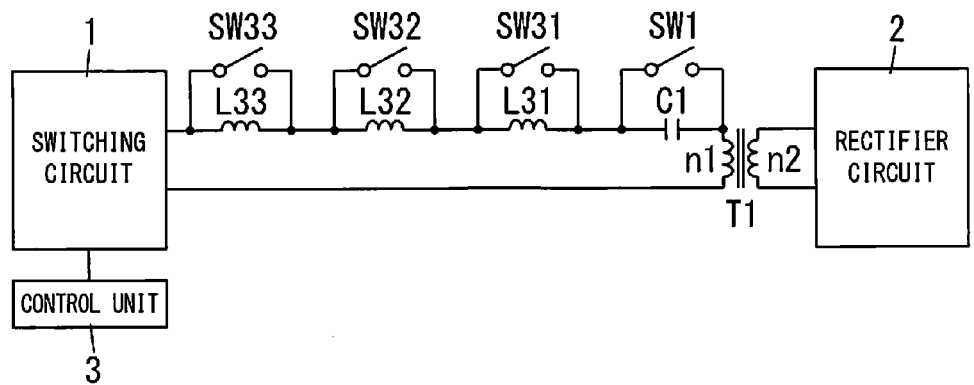
Figure 10:
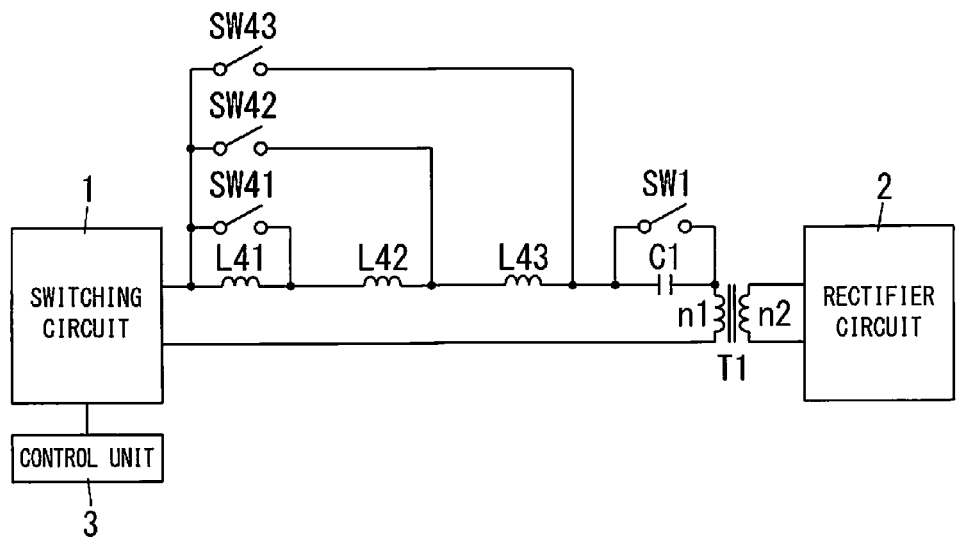
Figure 11:
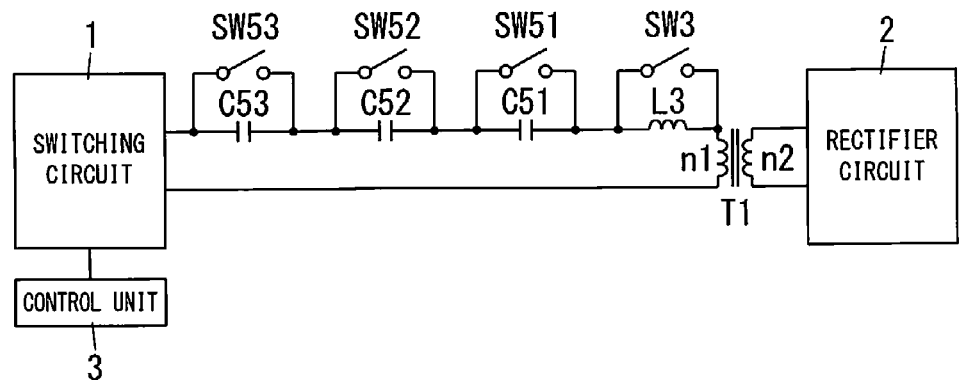
Figure 12:
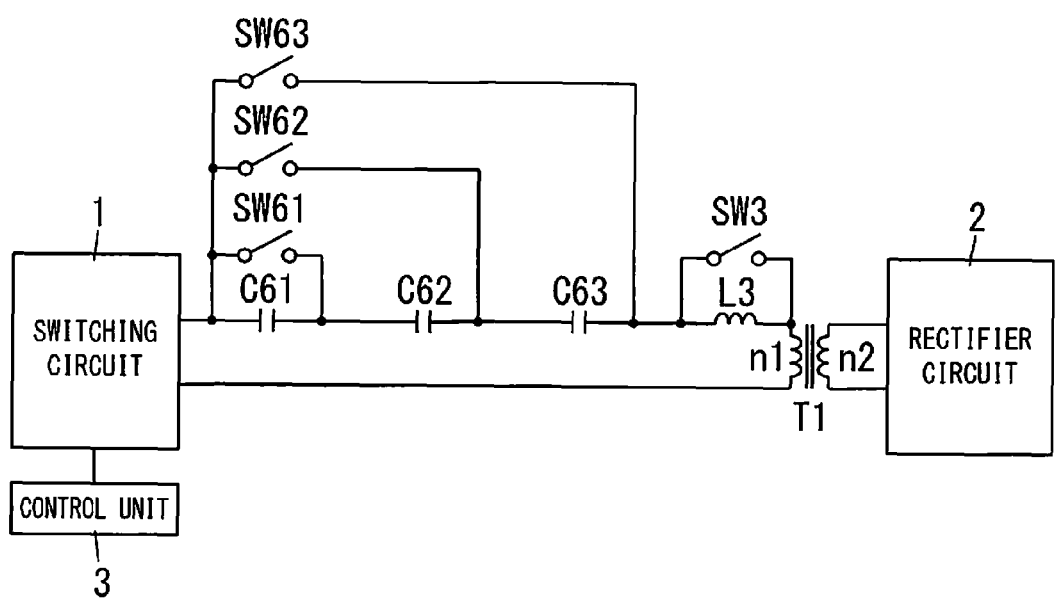

"A" of FIG. 4 is an explanatory diagram illustrating an operation of a switching element Q11 in a phase shift type conversion circuit of the electric power conversion device according to Embodiment 1; "B" of FIG. 4 is an explanatory diagram illustrating an operation of a switching element Q12 in the phase shift type conversion circuit of the electric power conversion device according to Embodiment 1; "C" of FIG. 4 is an explanatory diagram illustrating an operation of a switching element Q13 in the phase shift type conversion circuit of the electric power conversion device according to Embodiment 1; "D" of FIG. 4 is an explanatory diagram illustrating an operation of a switching element Q14 in the phase shift type conversion circuit of the electric power conversion device according to Embodiment 1; and "E" of FIG. 4 is a diagram illustrating a conduction state of a primary winding of a transformer in the phase shift type conversion circuit of the electric power conversion device according to Embodiment 1;

FIG. 5 is an explanatory diagram illustrating an operation of the electric power conversion device according to Embodiment 1 as the phase shift type conversion circuit;

"A" of FIG. 6 is a diagram illustrating a waveform of current flowing through a resonance circuit of the electric power conversion device according to Embodiment 1; and "B" of FIG. 6 is an explanatory operation diagram illustrating a switching timing of a switching element used in the electric power conversion device according to Embodiment 1;

"A" of FIG. 7 is an explanatory diagram illustrating an operation of a switching element Q11 of a switching circuit in the electric power conversion device according to Embodiment 1; "B" of FIG. 7 is an explanatory diagram illustrating an operation of a switching element Q12 of the switching circuit in the electric power conversion device according to Embodiment 1; "C" of FIG. 7 is an explanatory diagram illustrating an operation of a switching element Q13 of the switching circuit in the electric power conversion device according to Embodiment 1; and "D" of FIG. 7 is an explanatory diagram illustrating an operation of a switching element Q14 of the switching circuit in the electric power conversion device according to Embodiment 1;

FIG. 8 is a circuit diagram illustrating an electric power conversion device according to Embodiment 2;

FIG. 9 is a circuit diagram illustrating an electric power conversion device according to Embodiment 3;

FIG. 10 is a circuit diagram illustrating another configuration example of the electric power conversion device according to Embodiment 3;

FIG. 11 is a circuit diagram illustrating an electric power conversion device according to Embodiment 4; and FIG. 12 is a circuit diagram illustrating another configuration example of the electric power conversion device according to Embodiment 4.

BEST MODE FOR CARRYING OUT INVENTION

Embodiment 1

Although, in an embodiment described below, a case where an electric power conversion device performs DC/DC conversion uni-directionally will be described as an example, the technical idea described below can also be applicable to an electric power conversion device that performs DC/AC conversion or an electric power conversion device that performs electric power conversion bi-directionally. Also, although the electric power conversion device described below is assumed to be used for utilizing electric power of a storage battery mounted in an automobile having an electric motor as a power source, a storage battery used by being attached to a building, or the like, the application is not limited thereto. For example, the technique of the electric power conversion device described below may be adopted in a distributed power source such as a solar power generation device or a fuel cell.

Figure 1:
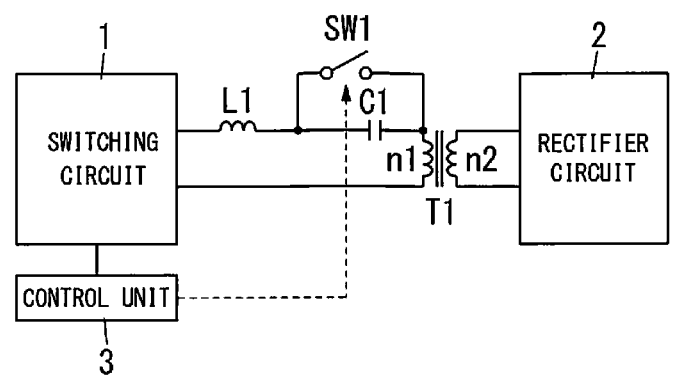
FIG. 1 is a circuit diagram illustrating an electric power conversion device according to Embodiment 1.

The electric power conversion device according to the present embodiment includes a switching circuit 1 and a rectifier circuit 2 with a transformer T1 interposed therebetween, as shown in FIG. 1. The switching circuit 1 includes four switching elements Q11 to Q14 (refer to FIG. 2) described later, and a control unit 3 is attached to the switching circuit 1 so as to control the switching elements Q11 to Q14. A primary winding n1 of the transformer T1 is connected to the switching circuit 1 via a series circuit constituted by a capacitor C1 serving as a capacitance element and an inductor L1. The rectifier circuit 2 is connected to a secondary winding n2 of the transformer T1. Furthermore, a switch SW1 is connected in parallel with the capacitor C1. The control unit 3 is also configured to control on/off of the switch SW1.

Figure 2:
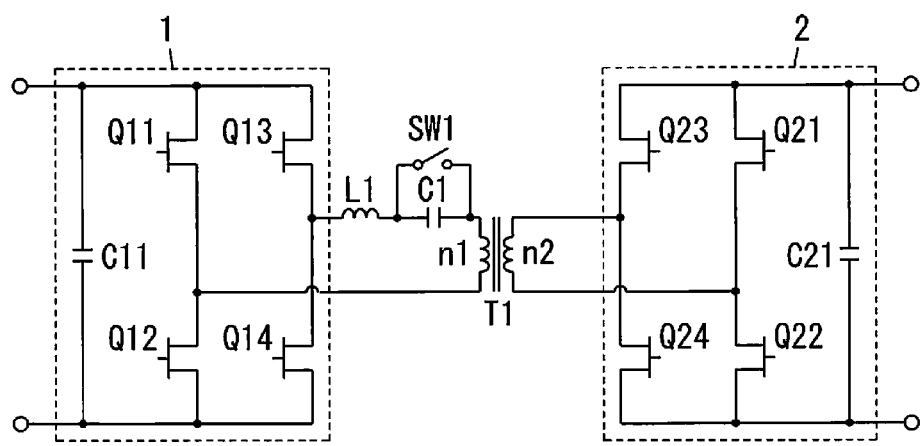
FIG. 2 is a specific circuit diagram illustrating an example of the electric power conversion device according to Embodiment 1.

The switching circuit 1 and the rectifier circuit 2 includes a configuration shown in FIG. 2, for example. The configuration shown in FIG. 2 is an example of the switching circuit 1 and the rectifier circuit 2, and the configuration of the switching circuit 1 and the rectifier circuit 2 is not limited thereto. Also, a DC power supply serving as an input power supply is connected to the switching circuit 1. The DC power supply may be a DC power supply obtained by rectifying a commercial AC power supply, other than being a storage battery, a fuel cell, a solar cell, or the like. Also, the DC power outputted from the rectifier circuit 2 may be used for charging a storage battery, in addition to being supplied to a load.

The switching circuit 1 shown in the diagram includes a bridge circuit constituted by the four switching elements Q11 to Q14. A series circuit of the switching elements Q11 and Q12 and a series circuit of the switching elements Q13 and Q14 are connected in parallel with a smoothing capacitor C11.

Also, the rectifier circuit 2 shown in the diagram uses a circuit having the same configuration as the switching circuit 1. That is, the rectifier circuit 2 includes a bridge circuit constituted by four switching elements Q21 to Q24. A series circuit of the switching elements Q21 and Q22 and a series circuit of the switching elements Q23 and Q24 are connected in parallel with a smoothing capacitor C21. By controlling on/off of the switching elements Q21 to Q24 in the rectifier circuit 2, electric power can be bi-directionally transmitted via the transformer T1. A description of operations to perform an electric power conversion bi-directionally will, however, be omitted in the present embodiment.

Each of the switching elements Q11 to Q14 and Q21 to Q24 is assumed to be a MOSFET. Note that a configuration in which a diode is connected anti-parallelly between an emitter and a collector of a bipolar transistor, an IGBT (Insulated Gate Bipolar Transistor), or the like may be used as each of the switching elements Q11 to Q14 and Q21 to Q24. These switching elements Q11 to Q14 and Q21 to Q24 can pass current in one direction or bi-directionally in an on-state, and can pass current in the other direction in an off-state. For example, in the case where the switching elements Q11 to Q14 and Q21 to Q24 are MOSFETs, the switching elements Q11 to Q14 and Q21 to Q24 can pass current via a path passing through a body diode (parasitic diode) in the off-state.

The rectifier circuit 2 shown in the diagram performs full-wave rectification using a function in the off-state of the switching elements Q21 to Q24. Note that synchronous rectification can also be performed if on/off of the switching elements Q21 to Q24 is controlled.

The control unit 3 includes a processor (selected from a microcontroller, a DSP (Digital Signal Processor), an FPGA (Field-Programmable Gate Array), or the like) that operates according to a program. The control unit 3 has a function of monitoring an output current of the rectifier circuit 2 using an output from a current detector (not shown) provided at an appropriate location, and includes an AD converter that converts analog information outputted from the current detector to digital information so as to be handled by the processor. On/off of each of the switching elements Q11 to Q14 is controlled by a pulse signal given by the control unit 3, and the frequency and the phase of the pulse signal are adjustable. That is, the control unit 3 includes a pulse generator that generates pulse signals, and performs control on the switching circuit 1, selecting from PFM (Pulse Frequency Modulation) control and PPM (Pulse Phase shift Modulation) control, by giving instructions to the pulse generator from the processor. Furthermore, the control unit 3 includes a memory that stores a program for causing the processor to operate, data for determining an operation condition of the processor, data that is generated during an operation of the processor, and the like.

A frequency for switching on/off the switching elements Q11 to Q14 is selected appropriately from a range of several tens of Hz to several hundreds of kHz. Here, since the switch SW1 is controlled based on the on/off timings of the switching elements Q11 to Q14, the switch SW1 is required to respond in a time period of approximately several µs to several tens of ms from the time when an instruction is given. Accordingly, it is desirable that a semiconductor switch having a short response time is used for the switch SW1, instead of using an electromagnetic relay including a mechanical contact.

Incidentally, when the switch SW1 is off, the capacitor C1 is electrically connected between the inductor L1 and the primary winding n1 of the transformer T1, and a resonance circuit is formed by the capacitor C1, the inductor L1, and the transformer T1. Accordingly, if the frequency of the switching circuit 1 is adjusted appropriately with respect to the resonance frequency of the resonance circuit, this resonance circuit and the switching circuit 1 operate as a first conversion circuit that changes the voltage that is outputted from the secondary winding n2 of the transformer T1. That is, a circuit that is on the input side of the rectifier circuit 2 operates as the first conversion circuit. The first conversion circuit is configured to change the relationship (voltage ratio) between an input voltage and an output voltage based on the operation frequency of the switching circuit 1. In this way, a configuration, in which the resonance circuit constituted by the inductor L1 and the transformer T1 with one capacitor C1 is used to change the output voltage of the rectifier circuit 2 by adjusting the operation frequency of the switching circuit 1, will be hereinafter referred to as "LLC resonance type conversion circuit". Note that the inductor L1 is not an essential constituent element in the first conversion circuit.

Hereinafter, in the configuration shown in FIG. 2, the two switching elements Q11 and Q14 and the two switching elements Q12 and Q13 that each have a positional relationship of being connected in series with the primary winding n1 of the transformer T1 interposed therebetween are each referred to as "opposing switching elements". When operating as the LLC resonance type conversion circuit, on/off of the opposing switching elements Q11 and Q14 are switched at the same time, and on/off of the opposing switching elements Q12 and Q13 are switched at the same time. Also, the two switching elements Q11 and Q12 that are connected in series are not made to be in on-states at the same time, and the two switching elements Q13 and Q14 that are connected in series are not made to be in on-states at the same time.

Figure 3:
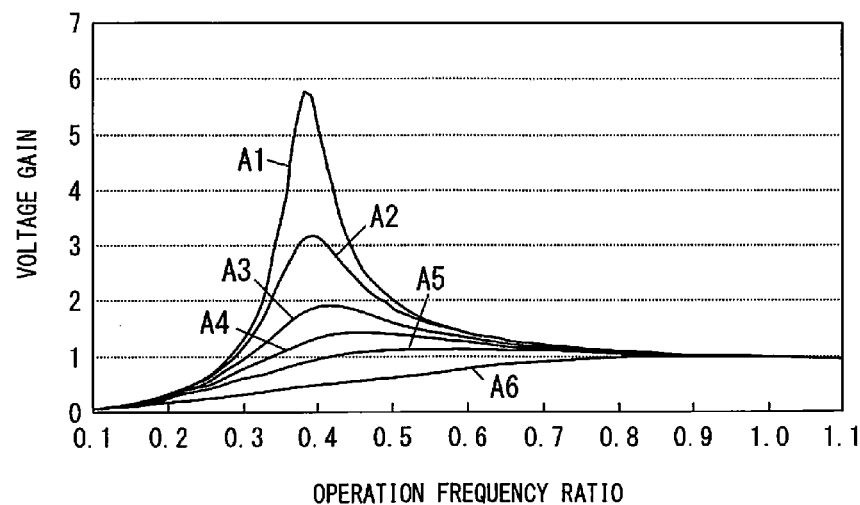
FIG. 3 is an explanatory diagram illustrating an operation of the electric power conversion device according to Embodiment 1 as an LLC resonance type conversion circuit.

FIG. 3 shows a relationship between the operation frequency of the switching circuit 1 in the LLC resonance type conversion circuit and a voltage gain of the output voltage of the rectifier circuit 2. Also, the curves denoted by reference signs A1 to A6 in FIG. 3 show results that are taken on different load sizes. The size of the load increases in the order from the curve A1 to the curve A6. That is, the load corresponding to the curve A1 is the smallest and the load corresponding to the curve A6 is the largest, among the curves A1 to A6.

In the illustrated example, when the load is light, the voltage gain reaches a peak when an operation frequency ratio is approximately 0.4, and the voltage gain decreases as the operation frequency ratio moves away from 0.4. The operation frequency ratio is a ratio of the operation frequency of the switching circuit 1 with respect to the resonance frequency determined by the capacitor C1 and the inductor L1. The lighter the load is, the stronger the resonance is that occurs in the LLC resonance type conversion circuit, and thus, in a case of a light load, the output voltage changes largely by the operation frequency of the switching circuit 1 merely changing slightly in the vicinity of the resonance point, possibly resulting in the output voltage becoming unstable. Furthermore, in the case of a light load, many noise components are included in the output of the rectifier circuit 2.

On the other hand, in an example shown in FIG. 3, when the load increases, the change of the output voltage with respect to the change of the operation frequency of the switching circuit 1 decreases, and an adjustable range of the voltage gain also decreases. That is, in the LLC resonance type conversion circuit, the resonance weakens in a region in which the load is large, and a change of the output voltage with respect to the change in the operation frequency of the switching circuit 1 decreases. At this time, the noise component included in the output of the rectifier circuit 2 decreases compared with the case of a light load.

As described above, in the LLC resonance type conversion circuit, the voltage ratio (voltage gain) of the output voltage to the input voltage can, depending on the size of the load, be changed by changing the operation frequency ratio. Furthermore, a voltage boost is possible, and adjustment of the voltage boost ratio becomes possible. However, since the operation becomes unstable when the load is light, the adjustable range of the voltage gain is relatively narrow in the load range where a stable operation can be achieved.

On the other hand, when the switch SW1 is in an on-state, the capacitor C1 is short-circuited, and thus only the inductor L1 and the transformer T1 are electrically interposed between the switching circuit 1 and the rectifier circuit 2. In this case, due to a change in the current flowing through the inductor L1 and the primary winding n1 of the transformer T1, the output voltage of the rectifier circuit 2 changes. In this operation, electromagnetic energy accumulated in the transformer T1 due to the current flowing through the primary winding n1 of the transformer T1 is transferred to the secondary winding n2. Accordingly, by adjusting the electromagnetic energy accumulated in the transformer T1 per unit time period, the circuit constituted by the inductor L1, the transformer T1, and the switching circuit 1 functions as a second conversion circuit that adjusts the output voltage of the rectifier circuit 2. That is, the input side circuit of the rectifier circuit 2 functions as the second conversion circuit. The second conversion circuit changes a relationship (voltage ratio) between the input voltage and the output voltage based on the period during which current flows from the switching circuit 1 to the primary winding n1 of the transformer T1. Note that the inductor L1 is not an essential constituent element in the second conversion circuit.

In order to adjust the period during which current flows through the primary winding n1 of the transformer T1, the phases of switching on the switching elements Q11 to Q14, as shown in "A" to "D" of FIG. 4, are adjusted, for example. In this way, a configuration in which the phases of switching on the switching elements Q11 to Q14 of the switching circuit 1 are changed in order to adjust the current that flows through the primary winding n1 of the transformer T1 per unit time period (that is, second conversion circuit) will hereinafter be referred to as a "phase shift type conversion circuit".

In the phase shift type conversion circuit, without changing the duty cycles of the four switching elements Q11 to Q14 that constitute the switching circuit 1, the timings at which the switching elements are turned on in each pair of switching elements that need to be on to allow current to flow through the transformer T1, out of the switching elements Q11 to Q14, are changed such that the period in which the opposing switching elements are on at the same time is changed. That is, the output electric power is adjusted by adjusting the timings at which the opposing switching elements Q11 and Q14 are turned on such that the period of being on at the same time is adjusted, and by adjusting the timings at which the opposing switching elements Q12 and Q13 are turned on such that the period of being on at the same time is adjusted.

In the circuit shown in FIG. 2, current flows through the primary winding n1 of the transformer T1 in the period during which the opposing switching elements Q11 and Q14 are on at the same time, and the period during which the opposing switching elements Q12 and Q13 are on at the same time (refer to "E" of FIG. 4). Accordingly, by adjusting the timings at which the opposing switching elements Q11 and Q14 are turned on, or adjusting the timings at which the opposing switching elements Q12 and Q13 are turned on, the period during which current flows through the primary winding n1 is adjusted, and as a result the output voltage of the rectifier circuit 2 is adjusted. Note that the switching elements Q11 and Q12 that are connected in series or the switching elements Q13 and Q14 that are connected in series are prohibited from being on at the same time, and the switching on/off of the switching elements Q11 and Q12 or the switching elements Q13 and Q14 are controlled such that the phases thereof being on/off are inverted. That is, the on/off of the switching element Q11 is inverted from the on/off of the switching element Q12, and the on/off of the switching element Q13 is inverted from the on/off of the switching element Q14.

Referring to operations shown in "A" to "E" of FIG. 4, duty cycles of the switching elements Q11 to Q14 are set to 50% and the on period of the switching element Q11 differs from the on period of the switching element Q13 by a phase difference Ts, as shown in "A" to "D" of FIG. 4. Accordingly, the on periods of the opposing switching elements Q11 and Q14 overlap during a period corresponding to the phase difference Ts, and the on periods of the opposing switching elements Q12 and Q13 overlap during a period corresponding to the phase difference Ts. The phase difference Ts is assumed to be 0 degrees when the on periods of the switching element Q11 and the switching element Q13 do not overlap, and to be 180 degrees when the on periods of the switching element Q11 and the switching element Q13 coincide. That is, the phase difference Ts corresponds to a value represented by an angle the period in which the opposing switching elements Q11 and Q14 are on at the same time and the period in which the opposing switching elements Q12 and Q13 are on at the same time, with the angle being 180 degrees when the on periods of the switching element Q11 and the switching element Q13 coincide.

When the switching circuit 1 performs the operations described above, a current flows through the primary winding n1 of the transformer T1 only in the period corresponding to the phase difference Ts among the on periods of the switching elements Q11 to Q14, as shown in "E" of FIG. 4. The direction of the current flowing through the primary winding n1 of the transformer T1 in the period during which the opposing switching elements Q11 and Q14 are on at the same time is inverted from the direction of the current in the period during which the opposing switching elements Q12 and Q13 are on at the same time. According to these operations, an alternating voltage is induced in the secondary winding n2 of the transformer T1.

FIG. 5 shows the relationship between the phase difference Ts and the voltage gain of the output voltage of the rectifier circuit 2 in the phase shift type conversion circuit. As shown in FIG. 5, the voltage gain has an approximately linear relationship with the phase difference Ts in the phase shift type conversion circuit. That is, in the phase shift type conversion circuit, the output voltage from the rectifier circuit 2 can be changed by adjusting the phase difference Ts relating to the period during which the opposing switching elements Q11 and Q14 are on at the same time and the period during which the opposing switching elements Q12 and Q13 are on at the same time.

Also, the phase shift type conversion circuit is characterized in that the adjustable range of the voltage ratio (voltage gain) between the input voltage and the output voltage is relatively wide. When the configuration shown in FIG. 2 is operated as the phase shift type conversion circuit, noise is reduced compared with forward type converters or flyback type converters, since a period during which current does not flow is unlikely to occur. Note that the voltage adjustment can only be performed in a voltage range not exceeding an upper limit value, with the upper limit value being a voltage determined by the winding ratio (number of winding of secondary winding n2/number of winding of primary winding n1) of the transformer T1.

As described above, the control unit 3 is configured to select the operation of the switching circuit 1 from a first operation and a second operation. The first operation is an operation in which the relationship (voltage ratio) between the input voltage and the output voltage is adjusted by controlling the operation frequency of the switching circuit 1. The second operation is an operation in which the relationship (voltage ratio) between the input voltage and the output voltage is adjusted by controlling the period during which a current flows from the switching circuit 1 to the primary winding n1 of the transformer T1. Operations of both the LLC resonance type conversion circuit and the phase shift type conversion circuit are possible by only changing the operation of the switching circuit 1 by switching on/off the switch SW1. Accordingly, both features of the LLC resonance type conversion circuit and the phase shift type conversion circuit can be utilized so as to complement each other according to the state of the load.

Also, the configuration according to the present embodiment is realized by adding the switch SW1 to the LLC resonance type conversion circuit and adding, to the control unit 3, a program for enabling an operation as the phase shift type conversion circuit. Accordingly, in a case where the LLC resonance type conversion circuit has already been designed, an electric power conversion device having the functions of both the LLC resonance type conversion circuit and the phase shift type conversion circuit can be provided without a large-scale design change.

For example, the case is assumed where the input voltage is 400V and the output voltage is changed in a range from 100 to 500V. In this case, in a range of the output voltage from 100 to 400V, it is possible to adjust the output voltage in a wide range by causing the conversion circuit to operate as the phase shift type conversion circuit by switching on the switch SW1. On the other hand, in a range of the output voltage from 400 to 500V, it is possible to obtain an output voltage in a voltage range higher than the input voltage by causing the conversion circuit to operate as the LLC resonance type conversion circuit by switching off the switch SW1.

Also, in a case where the current detector is provided as described above, the on/off of the switch SW1 may be determined based on the output current of the rectifier circuit 2 (electric power conversion device). The input side circuit of the rectifier circuit 2 may be caused to operate as the phase shift type conversion circuit if the output current is a prescribed value (1 A, for example) or less in a case where the load is light, and the input side circuit of the rectifier circuit 2 may be caused to operate as the LLC resonance type conversion circuit if the output current exceeds the prescribed value. In this operation, a stable operation with a small noise component is possible by causing the input side circuit of the rectifier circuit 2 to operate as the phase shift type conversion circuit in a light load region in which the operation of the LLC resonance type conversion circuit becomes unstable and a noise component increases in the output of the rectifier circuit 2.

There are cases where an electric power conversion efficiency is considered as a condition to switch on/off the switch SW1. For example, in a case where both the LLC resonance type conversion circuit and the phase shift type conversion circuit can be used such that a ratio of the input voltage and the output voltage becomes a desired voltage ratio, it is possible to determine the on/off of the switch SW1 based on the conversion efficiency. For example, assuming that the conversion efficiency of the LLC resonance type conversion circuit is E1, the conversion efficiency of the phase shift type conversion circuit is E2, and E1 and E2 satisfy a condition of E1>E2 when the input voltage and the output voltage are desired values, it is desirable to use the LLC resonance type conversion circuit, since the conversion efficiency is higher compared with a case where the phase shift type conversion circuit is used.

That is to say, the control unit 3 is configured to select whichever of the first operation and the second operation has a higher stored conversion efficiency, when both the first operation of the first conversion circuit and the second operation of the second conversion circuit are operable, in an overlapping region between the relationship (voltage ratio) in the first conversion circuit and the relationship (voltage ratio) in the second conversion circuit.

Note that, in a case where the on/off of the switch SW1 is determined while taking the conversion efficiency into consideration as described above, the relationship between the efficiency and the input voltage and the output voltage needs to be stored in the control unit 3. Also, a function of notifying the input voltage and the output voltage of the control unit 3 is required.

As described above, an operation as the LLC resonance type conversion circuit and an operation as the phase shift type conversion circuit can be switched by selecting the on/off of the switch SW1 so as to change the operation of the switching circuit 1. Accordingly, usability is improved by switching on/off the switch SW1 while focusing on the output voltage range, the size of the load, the conversion efficiency, or the like.

Incidentally, when the switch SW1 is switched from off to on in order to switch from operating as the LLC resonance type conversion circuit to operating as the phase shift type conversion circuit, there are cases where charges are accumulated in the capacitor C1. When the switch SW1 is switched on in a state in which charges are accumulated in the capacitor C1, it is possible that a rush current flows through the switch SW1. The occurrence of such a rush current puts much stress on the switch SW1. Also, since the voltage gain differs in the operation of the LLC resonance type conversion circuit and in the operation of the phase shift type conversion circuit, the output voltage changes when the on/off of the switch SW1 is switched if the voltage gain is not considered when the on/off of the switch SW1 is switched.

In order to prevent the rush current, the control unit 3 should switch on the switch SW1 at the time of a zero-cross point of the current flowing through the resonance circuit constituted by the inductor L1, the capacitor C1, and the transformer T1 in a period during which the conversion circuit is operated as the LLC resonance type conversion circuit. The current Iq flowing through the resonance circuit has a waveform as shown in "A" of FIG. 6. The waveform of the current Iq is aligned with the on/off timings of the switching elements Q11 and Q14 shown in "B" of FIG. 6, and the current Iq becomes zero at the timings of switching on/off the switching elements Q11 and Q14, and the polarity of the current Iq inverts.

Accordingly, switching on the switch SW1 at the timing of switching on/off the switching element Q11 and Q14 prevents the rush current caused by the charges in the capacitor C1 from flowing through the switch SW1. In the illustrated example, the timing at which the switch SW1 is switched on is designated by an arrow, and this timing is matched with the timing at which the switching elements Q11 and Q14 are switched on. Although the timing shown in the diagram (timing at which switch SW1 is switched on) is matched with the timing at which the switching element Q11 and Q14 are switched on, the timing may be matched with the timing at which the switching element Q11 and Q14 are switched off.

Also, since the above operations are aligned with the on/off timing of the switching elements Q11 and Q14, the control unit 3 can easily determine the timing at which the switch SW1 is switched on. Note that it is possible, by detecting the voltage between two terminals of the capacitor C1 or by detecting the resonance current that flows through the resonance circuit, to determine the timing at which the switch SW1 is switched on according to the detected state.

Due to the above operations, the switch SW1 is switched on in a state in which charges are not accumulated in the capacitor C1 when transitioning from the LLC resonance type conversion circuit to the phase shift type conversion circuit. Accordingly, a rush current is prevented from flowing from the capacitor C1 to the switch SW1 when the switch SW1 is switched on. That is, the transition from the LLC resonance type conversion circuit to the phase shift type conversion circuit can be performed seamlessly.

Incidentally, the on/off timings of the switching elements Q11 to Q14 differs between a period during which the conversion circuit operates as the LLC resonance type conversion circuit and a period during which the conversion circuit operates as the phase shift type conversion circuit, as described above. Accordingly, the control unit 3 needs to also change the on/off timings of the switching elements Q11 to Q14 when switching on/off the switch SW1. However, it is difficult to adjust the phases of on/off of the switching elements Q11 to Q14 instantly when shifting between the LLC resonance type conversion circuit and the phase shift type conversion circuit. Therefore, it is desirable that a transition period during which the on/off timings of the switching elements Q11 to Q14 are changed is provided before and after the timing at which the switch SW1 is switched on/off. In the transition period, the on/off of the switching elements Q11 to Q14 is temporarily suspended or the on/off timings of the switching elements Q11 to Q14 are forcedly changed.

An example of on/off timings of the switching elements Q11 to Q14 is shown in "A" to "D" of FIG. 7 in the case of transitioning from operating as the LLC resonance type conversion circuit to operating as the phase shift type conversion circuit. When operating as the LLC resonance type conversion circuit, the on/off timings are the same for the opposing switching elements Q11 and Q14, and the on/off timings are the same for the opposing switching elements Q12 and Q13. Also, when operating as the phase shift type conversion circuit, an appropriate phase difference is given between on timings of the opposing switching elements Q11 and Q14, and an appropriate phase difference is given between on timings of the opposing switching elements Q12 and Q13.

When transitioning from the operation as the LLC resonance type conversion circuit to the operation as the phase shift type conversion circuit, a transition period Ps during which all the switching elements Q11 to Q14 are switched off is provided. The control unit 3 is configured to switch on the switch SW1 in this transition period Ps.

Incidentally, when transitioning between the LLC resonance type conversion circuit and the phase shift type conversion circuit, the output voltage of the rectifier circuit 2 preferably does not vary. Accordingly, when the operation is transitioned, the control unit 3 needs to adjust the on/off timings of the switching elements Q11 to Q14 such that the output voltage of the rectifier circuit 2 remains the same. In order to realize this operation, the relationship between the operation frequency and the voltage gain in the LLC resonance type conversion circuit and the relationship between the phase difference Ts and the voltage gain in the phase shift type conversion circuit are stored in a storage unit provided in the control unit 3. Also, the control unit 3 is configured to monitor the input voltage, the output voltage, and the output current, and determine the on/off timings of the switching elements Q11 to Q14 according to the voltage gain immediately before transitioning between the LLC resonance type conversion circuit and the phase shift type conversion circuit by referring to the storage unit. Variation in the output voltage of the rectifier circuit 2 is suppressed by this operation when switching between operations of the LLC resonance type conversion circuit and the phase shift type conversion circuit.

The relationship between the voltage gain and the conversion efficiency of the LLC resonance type conversion circuit and the relationship between the voltage gain and the conversion efficiency of the phase shift type conversion circuit may be stored in the storage unit provided in the control unit 3. That is, if the relationships between the conversion efficiency and the voltage ratio (voltage gain), which is a ratio of the input voltage and the output voltage, are known for both the LLC resonance type conversion circuit and the phase shift type conversion circuit, an operation having higher conversion efficiency can be selected out of the operation of the LLC resonance type conversion circuit and the operation of the phase shift type conversion circuit according to the relationship between the input voltage and the output voltage. That is, when both the LLC resonance type conversion circuit and the phase shift type conversion circuit are operable in order to obtain a desired voltage ratio between the input voltage and the output voltage, the control unit 3 determines the on/off of the switch SW1 based on the conversion efficiency, as described above.

In the embodiment described above, although the capacitor C1 is inserted between the inductor L1 and the transformer T1, a similar operation can be obtained in a configuration in which an inductor L1 is inserted between the capacitor C1 and the transformer T1.

Note that although, in the present embodiment, only a configuration in which electric power is supplied from the switching circuit 1 to the transformer T1 is described, it is possible to supply electric power from the rectifier circuit 2 to the transformer T1 by controlling the on/off of the switching elements Q21 to Q24 provided in the rectifier circuit 2. That is, electric power can be transmitted bi-directionally. Also, the switching circuit 1 is not limited to the configuration shown in FIG. 2. The switching circuit 1 may include a configuration in which a period during which current flows through the series circuit constituted by the primary winding n1 of the transformer T1 and the capacitor C1 is controlled by switching.

Embodiment 2

As shown in FIG. 8, an electric power conversion device according to the present embodiment includes a configuration in which a series circuit constituted by a switch SW2 and a resistor R2 is connected in parallel with the switch SW1 in the configuration of Embodiment 1.

When transitioning from an LLC resonance type conversion circuit to a phase shift type conversion circuit in the configuration according to the present embodiment, a control unit 3 is configured to switch on the switch SW2 before switching on the switch SW1. That is, the control unit 3 is configured to switch on the switch SW1 after switching on the switch SW2 when transitioning from a first operation of the LLC resonance type conversion circuit to a second operation of the phase shift type conversion circuit. A timing at which the switch SW2 is switched on need not be matched with the on/off timings of switching elements Q11 to Q14. When the switch SW2 is switched on, charges accumulated in the capacitor C1 are discharged via the resistor R2, and the current flowing through the switch SW2 is limited by the resistance value of the resistor R2.

Furthermore, after the switch SW2 is switched on and the charge amount in the capacitor C1 decreases, the control unit 3 is configured to switch on the switch SW1. The charge amount over time in the capacitor C1 after the switch SW2 is switched on is determined by a voltage between the two terminals and the capacitance of the capacitor C1 and a resistance value of the resistor R2. Accordingly, the time period from switching on the switch SW2 to switching on the switch SW1 is dependent on the voltage between the two terminals of the capacitor C1. When simplified control is desired, the time period may be set to a fixed time period using the capacitance of the capacitor C1 and the resistance value of the resistor R2.

In this configuration, since the timing at which the switch SW1 is switched on does not depend on the waveform of the current flowing through the resonance circuit, the response time of the switch SW1 need not be taken into consideration, and it is possible to use an electromagnetic relay having a longer response time than the semiconductor switch as the switch SW1. The other configurations and operations of the present embodiment are similar to those of Embodiment 1.

Embodiment 3

An electric power conversion device according to the present embodiment is a modification of Embodiment 1, and uses a plurality of (three each in diagram) inductors L31 to L33 and switches (short-circuit switches) SW31 to SW33, as shown in FIG. 9, instead of using the inductor L1 shown in FIG. 1. The switches SW31 to SW33 are respectively connected in parallel with the inductors L31 to L33. That is, the switch SW31 is connected in parallel with the inductor L31, the switch SW32 is connected in parallel with the inductor L32, and the switch SW33 is connected in parallel with the inductor L33. Accordingly, at least one of the inductors L31 to L33 is used in a resonance circuit, depending on the combination of on/off of the switches SW31 to SW33. In other words, the inductance used in the resonance circuit is adjusted by combining the on/off of the switches SW31 to SW33, and as a result the resonance frequency can be selected from a plurality of frequencies.

For example, in the configuration shown in the diagram, if the switch SW31 is switched off and the switches SW32 and SW33 are switched on, only the inductor L31 effectively functions in the resonance circuit. Also, if all the switches SW31 to SW33 are switched off, a series circuit of the three inductors L31 to L33 effectively functions in the resonance circuit. Accordingly, it is possible to change the resonance frequency of the resonance circuit in a wide range.

Instead of the configuration shown in FIG. 9, the electric power conversion device may use a plurality of (three each in diagram) inductors L41 to L43 and switches SW41 to SW43 so as to have the connection relationship shown in FIG. 10, instead of using the inductor L1 shown in FIG. 1. In this configuration, the three inductors L41 to L43 are connected in series, and one terminal (first terminal) of each of the three switches SW41 to SW43 is connected to one terminal of the series circuit of the inductors L41 to L43. Also, the other terminal (second terminal) of each of the three switches SW41 to SW43 is respectively connected to one terminal of the three inductors L41 to L43. That is, the switch SW41 is connected in parallel with the inductor L41, the switch SW42 is connected in parallel with a series circuit of the inductors L41 and L42, and the switch SW43 is connected in parallel with the series circuit of the inductors L41 to L43.

In the configuration shown in FIG. 9, the number of types of selectable inductances is determined by the number of combinations of on/off of the switches SW31 to SW33. In the configuration shown in FIG. 10, the number of types of selectable inductances is one more than the number of switches SW41 to SW43. That is, in the configuration shown in FIG. 10, only four states are selectable, namely a state in which the switch SW43 is on, a state in which the switch SW43 is off and the switch SW42 is on, a state in which the switches SW42 and SW43 are off and the switch SW41 is on, and a state in which the switches SW41 to SW43 are off. However, whereas the number of switches SW41 to SW43 included in the resonance circuit is one or less in the configuration shown in FIG. 10, the number of switches SW31 to SW33 included in the resonance circuit changes in a range from zero to three in the configuration shown in FIG. 9. Accordingly, an average loss of the resonance circuit caused by the switch in the configuration shown in FIG. 10 is smaller than that in the configuration shown in FIG. 9.

Although the electric power conversion device according to the present embodiment includes three each of the inductors and the switches, the numbers of the inductors and the switches are selected arbitrarily according to the number of frequencies to which the resonance frequency is changed. The other configurations and operations of the present embodiment are similar to those of Embodiment 1, and also, the configuration of the present embodiment can be combined with a configuration in which the switch SW2 and the resistor R2 are provided similarly to Embodiment 2.

Embodiment 4

The present embodiment is a modification of Embodiment 1, and uses a plurality of (three each in diagram) capacitors C51 to C53 and switches SW51 to SW53 as shown in FIG. 11 as a capacitance element, instead of using the capacitor C1 shown in FIG. 1. The switches SW51 to SW53 are respectively connected in parallel with the capacitors C51 to C53. That is, the switch SW51 is connected in parallel with the capacitor C51, the switch SW52 is connected in parallel with the capacitor C52, and the switch SW53 is connected in parallel with the capacitor C53. Accordingly, at least one of the capacitors C51 to C53 is used in the resonance circuit depending on the combination of on/off of the switches SW51 to SW53. In other words, the capacitance used in the resonance circuit is adjusted by combining the on/off of the switches SW51 to SW53, and as a result the resonance frequency can be selected from a plurality of frequencies.

Also, in the diagram shown, an inductor L3 is used instead of the inductor L1, and a switch SW3 is connected in parallel with the inductor L3. Accordingly, whether or not the inductor L3 is included in the resonance circuit can be selected by the on/off of the switch SW3.

For example, in the configuration shown in the diagram, if the switch SW51 is switched off and the switches SW52 and SW53 are switched on, only the capacitor C51 effectively functions in the resonance circuit. Also, if all the switches SW51 to SW53 are switched off, a series circuit of the three capacitors C51 to C53 effectively functions in the resonance circuit. Accordingly, it is possible to change the resonance frequency of the resonance circuit in a wide range.

Instead of the configuration shown in FIG. 11, the electric power conversion device may use a plurality of (three each in diagram) capacitors C61 to C63 and the switches SW61 to SW63 so as to have the connection relationship shown in FIG. 12, instead of using the capacitor C1 shown in FIG. 1. In this configuration, the three capacitors C61 to C63 are connected in series, and one terminal (first terminal) of each of the three switches SW61 to SW63 is connected to one terminal of the series circuit of the capacitors C61 to C63. Also, the other terminal (second terminal) of each of the three switches SW61 to SW63 is respectively connected to one terminal of the three capacitors C61 to C63. That is, the switch SW61 is connected in parallel with the capacitor C61, the switch S62 is connected in parallel with the series circuit of capacitors C61 and C62, and the switch SW63 is connected in parallel with the series circuit of the capacitors C61 to C63.

In the configuration shown in FIG. 11, the number of types of selectable capacitances is determined by the number of combinations of on/off of the switches SW51 to SW53. In the configuration shown in FIG. 12, the number of types of selectable capacitances is one more than the number of switches SW61 to SW63. That is, in the configuration shown in FIG. 12, only four states are selectable, namely a state in which the switch SW63 is on, a state in which the switch SW63 is off and the switch SW62 is on, a state in which the switches SW62 and SW63 are off and the switch SW61 is on, and a state in which the switches SW61 to SW63 are off. However, whereas the number of switches SW61 to SW63 included in the resonance circuit is one or less in the configuration shown in FIG. 12, the number of switches SW51 to SW53 included in the resonance circuit changes in a range from zero to three in the configuration shown in FIG. 11. Accordingly, an average loss of the resonance circuit due to the switch in the configuration shown in FIG. 12 is smaller than that in the configuration shown in FIG. 11.

Also, as described in Embodiment 1, the timings at which the switches SW51 to SW53 or SW61 to SW63 are switched on are controlled so as to be matched with the on/off timings of the switching elements Q11 to Q14 provided in the switching circuit 1. Therefore, a rush current caused by the charges in the capacitors C51 to C53 or C61 to C63 is prevented from flowing through the switches SW51 to SW53 or SW61 to SW63.

Although the electric power conversion device according to the present embodiment includes three each of the capacitors and the switches, the numbers of the capacitors and the switches are selected arbitrarily according to the number of frequencies to which the resonance frequency is changed. The other configurations and operations of the present embodiment are similar to those of Embodiment 1, and also, the configuration of the present embodiment may be combined with a configuration in which the switch SW2 and the resistor R2 are provided similarly to Embodiment 2. Furthermore, the configuration of the present embodiment and the configuration shown in Embodiment 3 may be combined.

Although the present invention has been described in a preferred embodiment, various modifications and variations are possible by those skilled in the art without departing from the spirit or scope of this invention, that is, the claims.

The invention claimed is:

1. An electric power conversion device comprising:
   a transformer configured to transmit electric power between an input and an output;
   a resonance capacitance element connected in series with a primary winding of the transformer;
   a switching circuit configured to switch on/off current that flows through a series circuit constituted by the primary winding of the transformer and the capacitance element;
   a rectifier circuit configured to rectify and output electric power induced in a secondary winding of the transformer;
   a switch connected in parallel with the capacitance element; and
   a control unit configured to control a period during which current flows through the series circuit constituted by the primary winding of the transformer and the capacitance element and on/off of the switch,
   wherein the control unit is configured to switch off the switch so as to configure, as an input-side circuit of the rectifier circuit, a first conversion circuit configured to change a relationship between an input voltage and an output voltage based on an operation frequency of the switching circuit,
   the control unit being configured to switch on the switch so as to configure, as the input-side circuit of the rectifier circuit, a second conversion circuit configured to change a relationship between an input voltage and an output voltage based on a period during which current flows from the switching circuit to the primary winding of the transformer, the control unit being configured to select an operation of the switching circuit from a first operation for adjusting the relationship in the first conversion circuit by controlling the operation frequency and a second operation for adjusting the relationship in the second conversion circuit by controlling the period during which the current flows.

2. The electric power conversion device according to claim 1, wherein the control unit is configured to match a timing at which the switch is switched on with a zero-crossing point of current that flows from the switching circuit to the series circuit constituted by the primary winding of the transformer and the capacitance element, when transitioning from the first operation of the first conversion circuit to the second operation of the second conversion circuit.

3. The electric power conversion device according to claim 1, further comprising a series circuit constituted by a second switch and a resistor and connected in parallel with the capacitance element, wherein the control unit is configured to switch on the switch after switching on the second switch when transitioning from the first operation of the first conversion circuit to the second operation of the second conversion circuit.

4. The electric power conversion device according to claim 1, wherein the control unit is configured to provide a transition period during which an operation of the switching circuit is an operation different from the first operation of the first conversion circuit and the second operation of the second conversion circuit, when switching between the first operation of the first conversion circuit and the second operation of the second conversion circuit.

5. The electric power conversion device according to claim 1, wherein the control unit is configured to store the operation frequency of the switching circuit in the first operation of the first conversion circuit in association with the relationship in the first conversion circuit, and store the period during which current flows from the switching circuit to the primary winding of the transformer in the second operation of the second conversion circuit in association with the relationship in the second conversion circuit, the control unit being configured to control the switching circuit in accordance with the stored operation frequency and the stored period during which current flows, such that the relationship between the input voltage and the output voltage after switching coincides with the relationship between the input voltage and the output voltage before switching, when switching between the first operation of the first conversion circuit and the second operation of the second conversion circuit.

6. The electric power conversion device according to claim 1, wherein the control unit is configured to store a conversion efficiency in the first operation of the first conversion circuit in association with the relationship in the first conversion circuit, and store a conversion efficiency in the second operation of the second conversion circuit in association with the relationship in the second conversion circuit, the control unit being configured to select whichever of the first operation and the second operation has a higher stored conversion efficiency, when both the first operation of the first conversion circuit and the second operation of the second conversion circuit are operable, in an overlapping region between the relationship in the first conversion circuit and the relationship in the second conversion circuit.

7. The electric power conversion device according to claim 1, further comprising a resonance inductor that is connected between the primary winding of the transformer and the switching circuit.

8. The electric power conversion device according to claim 1, further comprising:

a plurality of resonance inductors that are connected between the primary winding of the transformer and the switching circuit; and a short-circuit switch configured to short-circuit at least one of the plurality of inductors.

9. The electric power conversion device according claim 1, wherein the capacitance element comprises a plurality of resonance capacitors that are connected between the primary winding of the transformer and the switching circuit, and wherein the switch is configured to short-circuit at least one of the plurality of capacitors.

10. The electric power conversion device according to claim 1, wherein the capacitance element comprises a resonance capacitor that is connected between the primary winding of the transformer and the switching circuit, and wherein the switch is configured to short-circuit the capacitor.

11. The electric power conversion device according to claim 1, wherein both the relationship in the first conversion circuit and the relationship in the second conversion circuit are a voltage ratio between the input voltage and the output voltage.

12. The electric power conversion device according to claim 1, wherein the first conversion circuit is a resonance type conversion circuit configured to change the relationship in the first conversion circuit using a resonance circuit constituted by the capacitance element and the transformer by adjusting the operation frequency of the switching circuit, and wherein the second conversion circuit is a phase shift type conversion circuit configured to change the relationship in the second conversion circuit by adjusting the period during which current flows from the switching circuit to the primary winding of the transformer through changing a phase of switching on a switching element of the switching circuit.

13. The electric power conversion device according to claim 2, wherein the control unit is configured to provide a transition period during which an operation of the switching circuit is an operation different from the first operation of the first conversion circuit and the second operation of the second conversion circuit, when switching between the first operation of the first conversion circuit and the second operation of the second conversion circuit.

14. The electric power conversion device according to claim 3, wherein the control unit is configured to provide a transition period during which an operation of the switching circuit is an operation different from the first operation of the first conversion circuit and the second operation of the second conversion circuit, when switching between the first operation of the first conversion circuit and the second operation of the second conversion circuit.

15. The electric power conversion device according to claim 2,
wherein the control unit is configured to store the operation frequency of the switching circuit in the first operation of the first conversion circuit in association with the relationship in the first conversion circuit, and store the period during which current flows from the switching circuit to the primary winding of the transformer in the second operation of the second conversion circuit in association with the relationship in the second conversion circuit,
the control unit being configured to control the switching circuit in accordance with the stored operation frequency and the stored period during which current flows, such that the relationship between the input voltage and the output voltage after switching coincides with the relationship between the input voltage and the output voltage before switching, when switching between the first operation of the first conversion circuit and the second operation of the second conversion circuit.

16. The electric power conversion device according to claim 3,
wherein the control unit is configured to store the operation frequency of the switching circuit in the first operation of the first conversion circuit in association with the relationship in the first conversion circuit, and store the period during which current flows from the switching circuit to the primary winding of the transformer in the second operation of the second conversion circuit in association with the relationship in the second conversion circuit,
the control unit being configured to control the switching circuit in accordance with the stored operation frequency and the stored period during which current flows, such that the relationship between the input voltage and the output voltage after switching coincides with the relationship between the input voltage and the output voltage before switching, when switching between the first operation of the first conversion circuit and the second operation of the second conversion circuit.

17. The electric power conversion device according to claim 2,
wherein the control unit is configured to store a conversion efficiency in the first operation of the first conversion circuit in association with the relationship in the first conversion circuit, and store a conversion efficiency in the second operation of the second conversion circuit in association with the relationship in the second conversion circuit,
the control unit being configured to select whichever of the first operation and the second operation has a higher stored conversion efficiency, when both the first operation of the first conversion circuit and the second operation of the second conversion circuit are operable, in an overlapping region between the relationship in the first conversion circuit and the relationship in the second conversion circuit.

18. The electric power conversion device according to claim 3,
wherein the control unit is configured to store a conversion efficiency in the first operation of the first conversion circuit in association with the relationship in the first conversion circuit, and store a conversion efficiency in the second operation of the second conversion circuit in association with the relationship in the second conversion circuit,
the control unit being configured to select whichever of the first operation and the second operation has a higher stored conversion efficiency, when both the first operation of the first conversion circuit and the second operation of the second conversion circuit are operable, in an overlapping region between the relationship in the first conversion circuit and the relationship in the second conversion circuit.

19. The electric power conversion device according to claim 2, further comprising a resonance inductor that is connected between the primary winding of the transformer and the switching circuit.

20. The electric power conversion device according to claim 3, further comprising a resonance inductor that is connected between the primary winding of the transformer and the switching circuit.

* * * * *